(12) United States Patent
Takano et al.

(10) Patent No.: US 8,507,096 B2
(45) Date of Patent: Aug. 13, 2013

(54) FLAKE PIGMENT, POWDER PAINT CONTAINING THE SAME, POWDER-COATED FILM OBTAINED BY COATING WITH THE POWDER PAINT USING TRIBOELECTRIFICATION ELECTROSTATIC COATING APPARATUS, PAINTED PRODUCT ON WHICH FILM IS FORMED, AND METHOD OF MANUFACTURING FLAKE PIGMENT

(75) Inventors: Yasushi Takano, Kashihara (JP); Taro Morimitsu, Osaka (JP); Haruhisa Kaiju, Owariasahi (JP)

(73) Assignee: Toyo Aluminum Kabushiki Kaisha, Osaka (JP)

( * ) Notice: Subject to any disclaimer, the term of this patent is extended or adjusted under 35 U.S.C. 154(b) by 350 days.

(21) Appl. No.: 12/921,720

(22) PCT Filed: Mar. 5, 2009

(86) PCT No.: PCT/JP2009/054144
§ 371 (c)(1),
(2), (4) Date: Sep. 9, 2010

(87) PCT Pub. No.: WO2009/113439
PCT Pub. Date: Sep. 17, 2009

(65) Prior Publication Data
US 2011/0008613 A1 Jan. 13, 2011

(30) Foreign Application Priority Data
Mar. 10, 2008 (JP) .................. 2008-059875

(51) Int. Cl.
| | | |
|---|---|---|
| B32B 27/06 | (2006.01) |
| B32B 27/30 | (2006.01) |
| B32B 15/08 | (2006.01) |
| B32B 15/082 | (2006.01) |
| B32B 5/16 | (2006.01) |
| C09C 1/00 | (2006.01) |
| C09C 3/00 | (2006.01) |
| B05D 7/14 | (2006.01) |
| B05D 7/00 | (2006.01) |
| C08L 25/06 | (2006.01) |
| C08L 27/12 | (2006.01) |
| C08L 33/12 | (2006.01) |

(52) U.S. Cl.
USPC ........... 428/407; 428/402; 428/403; 524/544; 524/560; 524/577

(58) Field of Classification Search
None
See application file for complete search history.

(56) References Cited

U.S. PATENT DOCUMENTS

| | | | |
|---|---|---|---|
| 3,941,731 A * | 3/1976 | Camelon et al. ............... 523/205 |
| 4,138,511 A | 2/1979 | Rolles et al. |
| 6,113,980 A * | 9/2000 | Laver ......................... 427/207.1 |
| 6,299,937 B1 * | 10/2001 | Richart ......................... 427/222 |
| 2003/0066457 A1 | 4/2003 | Hashizume et al. |
| 2006/0014858 A1 * | 1/2006 | Takano ......................... 523/204 |

(Continued)

FOREIGN PATENT DOCUMENTS

| | | |
|---|---|---|
| CN | 1774482 A | 5/2006 |
| JP | 51-137725 A | 11/1976 |

(Continued)

*Primary Examiner* — Vivian Chen
(74) *Attorney, Agent, or Firm* — Birch, Stewart, Kolasch & Birch, LLP (57) ABSTRACT

A flake pigment according to the present invention includes a flake particle, a single-layer or multiple-layer coat covering a surface of the flake particle, and a fine particle. An outermost layer of the coat includes a copolymer including one or more type of first bond unit originating from a fluoric polymerizable monomer having fluorine and one or more type of second bond unit originating from a polymerizable monomer having phosphate group. The fine particle is fixed with the outermost layer being interposed and has a characteristic to provide triboelectrification characteristics to the flake pigment.

13 Claims, 2 Drawing Sheets

(56) References Cited

U.S. PATENT DOCUMENTS

2006/0063004 A1* 3/2006 Takano et al. ................. 428/407
2008/0081864 A1* 4/2008 Takano ........................ 524/441

FOREIGN PATENT DOCUMENTS

| JP | 57-35214 | B2 | 7/1982 |
|----|----------|----|--------|
| JP | 9-71734 | A | 3/1997 |
| JP | 9-310034 | A | 12/1997 |
| JP | 2001-29877 | A | 2/2001 |
| JP | 2003-213157 | A | 7/2003 |
| JP | 2005-240013 | A | 9/2005 |
| JP | 2007-524733 | A | 8/2007 |
| WO | WO 02/094950 | A1 | 11/2002 |
| WO | WO 2005/007755 | A1 | 1/2005 |
| WO | WO 2005/007757 | A2 | 1/2005 |
| WO | WO 2006/064652 | A1 | 6/2006 |

* cited by examiner

FLAKE PIGMENT, POWDER PAINT CONTAINING THE SAME, POWDER-COATED FILM OBTAINED BY COATING WITH THE POWDER PAINT USING TRIBOELECTRIFICATION ELECTROSTATIC COATING APPARATUS, PAINTED PRODUCT ON WHICH FILM IS FORMED, AND METHOD OF MANUFACTURING FLAKE PIGMENT

TECHNICAL FIELD

The present invention relates to a flake pigment supplying a film with high brightness and at the same time free from unevenness of color. More specifically, the present invention relates to a flake pigment including a coat having an outermost layer made of a copolymer including a first bond unit originating from a fluoric polymerizable monomer having fluorine and a second bond unit originating from a polymerizable monomer having phosphate group, onto which fine particles providing triboelectrification characteristics are fixed with the outermost layer being interposed.

The present invention also relates to a powder paint containing the flake pigment. The present invention further relates to a powder-coated film exhibiting appearance free from color unevenness as a result of application of a powder paint including the flake pigment with a triboelectrification electrostatic coating apparatus and a painted product on which the film is formed. Moreover, the present invention also relates to a method of manufacturing a flake pigment.

BACKGROUND ART

A powder paint is increasingly demanded in a large number of industrial fields of automobiles, domestic electric appliances, furniture, machine tools, business machines, building materials, toys, etc. as a low-pollution paint using no organic solvent. When the powder paint is applied to a metallic finish containing a flake pigment such as an aluminum pigment, however, it is so difficult to arrange the flake pigments in parallel with a substrate that color tone is darkened and no sufficient metallicity is obtained. In order to overcome this disadvantage of the powder metallic pigment composition, considerable efforts for research and development have been made in various fields.

Conventionally developed methods of manufacturing powder metallic paints include a melt blending method of sufficiently kneading and mixing metal flake pigments in advance with resin or a coloring pigment by a melt process and thereafter pulverizing the same by crushing or the like, a dry blending method of mixing resin powders and flaky pigments with each other and applying the mixture, a bonded method using resin powders containing metal flaky pigments bonded to surfaces thereof, and the like (see, for example, Japanese Patent Laying-Open No. 51-137725 (Patent Document 1), Japanese Patent Publication No. 57-035214 (Japanese Patent Laying-Open No. 50-087426, Patent Document 2), Japanese Patent Laying-Open No. 09-071734 (Patent Document 3), and U.S. Pat. No. 4,138,511 (Patent Document 4)).

In the melt blending method, however, the flake pigments readily deform through the kneading and mixing step or a subsequent step of adjusting a particle size of the resin powders by crushing or the like. Therefore, appearance of a film obtained by applying a powder metallic paint manufactured with this method is not sufficiently satisfactory. When the metallic pigment is prepared from aluminum particles in this manufacturing method, active surfaces of aluminum are disadvantageously exposed in the crushing step to increase danger of ignition, dust explosion or the like.

The dry blending method has such an advantage that the metallic pigment is relatively less likely to deform, however, the metallic pigment must be charged in application when the powder paint is applied with electrostatic coating using a corona method (a high-voltage forced charging method), and hence the surface of the metallic pigment must be coated with resin in advance if such a metal pigment as aluminum particles is employed as the metallic pigment. Further, the resin powders and the metallic pigment easily separate from each other in application due to different charging rates between the metallic pigment and the resin powders. Therefore, the content of the metallic pigments in the powder paint varies before and after application and hence the color tone so changes when the paint is recovered and used that it is virtually impossible to recycle the paint.

The corona method is a charging method, in which air passing in the vicinity of an electrode is charged, charge transfer from the charged air to resin powders or pigment particles occurs, and consequently the resin powders or pigment particles are charged. Generally, charge transfer from air to a powder paint is less than 1%, and the charged powder paint and a large amount of air bearing charges of the same conductivity type (generally negative charges) arrive at a plate to be painted. Here, in the case of a powder metallic paint, such a phenomenon that flake pigments that have once electrostatically been deposited are partially blown away due to electrostatic repulsion by wind bearing charges of the same conductivity type occurs, and consequently the film after baking suffers color unevenness. In addition, in an example where dry-blended metallic pigments are applied with the corona method, the problem of spitting is inevitable, although a degree may be different.

Meanwhile, there is another triboelectrification-type (also referred to as tribo-type) coating method available as a method of electrostatic powder coating. In triboelectrification, unlike the corona method, resin powders or pigment particles are directly rubbed against each other and charged, so that no charged air is generated. Therefore, in applying a dry-blended powder paint containing metallic pigments, no color unevenness is caused. In addition, as a high-voltage electrode does not exist, spitting is also less likely. Triboelectrification, however, achieves charging by rubbing resin powders or pigment particles against each other, and hence it also has such shortcomings that a raw material having triboelectrification characteristics (characteristics that a material is charged by friction; also referred to as tribo-characteristics) can only be used. A raw material poor in triboelectrification characteristics can be used for triboelectrification-type coating after a positive charging agent is added to the powder paint as an additive. In general, alumina fine particles (such as aerogel of alumina), titanium oxide and the like are used, however, there are also raw materials that cannot have triboelectrification characteristics sufficient for coating even after a positive charging agent is added, and such a raw material cannot be used for triboelectrification-type coating.

Other than the melt blending method and the dry blending method, a bonded method with which a flake pigment is bonded to resin powders is available. A method of adhering a metallic pigment to a resin powder surface with a brush polisher, a method of transferring and bonding a metallic pigment to resin powders by bringing the resin powders into contact with a dispersion medium such as an alumina ball covered with the metallic pigments, and the like have conventionally been proposed as the bonded method. Recently, however, it seems that the following two methods have generally been established. One is a method of heat sealing of a powder paint resin and a metallic pigment by dispersing the powder paint resin and the metallic pigment using a three-dimensional rotary mixer or the like at a temperature around a melting point of the powder paint resin (H. Groebl, "Farbe and Lacke," 80, 930 (1974)). Another method is a method of bonding a powder paint resin and a metallic pigment to each other using a binder, in which they are dry-blended in a dispersion tank, thereafter a binder solution is sprayed while stirring and dispersion is continued, and a binder solvent is subsequently distilled by producing vacuum in the dispersion tank (see WO02/094950 (Patent Document 5)). These methods are advantageous in that a rate of introduction of the metallic pigment in the film is stable, color unevenness is less likely, and the powder paint recovered without adhering to a substrate can be reused.

With the heat sealing method, however, it is extremely difficult to evenly and uniformly heat powders in mass production facilities and hence a resin in a local portion where a temperature is excessively high is molten and blocking occurs. Therefore, an operation is difficult. Namely, it is difficult to bond the whole metallic pigments to the resin powders and hence free particles of the metallic pigments not bonded to the resin powders also remain in a large quantity.

If the quantity of free particles of the metallic pigments is increased, a blending ratio between the resin powders and the metallic pigments changes due to difference in bonding efficiency when the paint is recovered and used, and the paint cannot be reused after recovery as in the dry blending method. When a metal pigment such as aluminum particles or the like is employed as the metallic pigment, danger of ignition, dust explosion or the like is also increased due to a large quantity of free metallic pigments.

In any case, though the bonded method is an excellent method in the sense of recovery and reuse of the paint that has not deposited to the substrate and improvement in color unevenness, from a point of view of sufficient metallicity, it is equivalent to the dry blending method, although it is superior to the melt blending method. The greatest disadvantage of the bonded method is cost. Any method belonging to the bonded method is a process starting from dry blending, and when the bonded method is compared with dry blending in terms of cost, every cost for the process leads to increase in cost.

From a point of view of improvement in metallicity, a technique related to scaly aluminum having a surface covered with a phosphate-group-containing compound is also disclosed (see, for example, Japanese Patent Laying-Open No. 2001-029877 (Patent Document 6)). The document above describing a phosphate-group-containing unsaturated monomer and styrene, however, also states that a hydroxyl-group-containing unsaturated monomer is essential. Protons of hydroxyl groups are also active protons, and complicated chain transfer reaction occurs, reproducibility of a composition of a generated polymer or the like cannot be achieved, and performance becomes unstable when polymerization is performed under coexistence of the phosphate-group-containing unsaturated monomer with the hydroxyl-group-containing unsaturated monomer due to polymerization under existence of two types of active protons different in properties. Further, this document is silent about a fluoric monomer.

In addition, though the document above describes a polymer of a phosphate-group-containing unsaturated monomer and perfluorocyclohexyl(meth)acrylate which is a fluoric monomer, it is a dispersion prepared by dispersing polymerizing particles with a macromolecular dispersion stabilizer that is described in this document, and the polymer is not dissolved in a solution. When covering with such a dispersion is conducted, in a covering process, an adsorbed macromolecular dispersion stabilizer layer forms an outermost layer regardless of whether micellar particulates aggregate on scaly aluminum to cover the same or micellar rupture occurs to form a film, and hence effects of the invention are significantly affected by the macromolecular dispersion stabilizer.

In order to solve these problems, the present inventors invented a method employing an aluminum flake pigment having a surface covered with fluororesin containing alkyl fluoride group in molecules, and filed a patent application (see, for example, Japanese Patent Laying-Open No. 2003-213157 (Patent Document 7)). This method can achieve arrangement of aluminum flake pigments in parallel with a substrate by causing the aluminum flake pigments to float at the surface of a film utilizing low affinity of alkyl fluoride group to other substances and attains excellent metallicity despite powder coating.

On the other hand, adhesiveness is so disadvantageously poor due to low affinity of alkyl fluoride group to other substances that an overcoat layer tends to peel off when an overcoat clear is applied or a mending layer tends to peel off when a flaw or the like of the film is mended with the same paint.

As a result of further dedicated studies conducted in order to solve this problem, the present inventors have found that a flake pigment suitably used in a powder paint and providing high brightness to a film and good adhesiveness can be obtained by covering a surface of a flake particle with a coat having a resin composition containing a copolymer including a bond unit originating from a fluoric polymerizable monomer having fluoroalkyl group and a bond unit originating from a polymerizable monomer having phosphate group, and filed a patent application (see WO2005/007755 (Patent Document 8)). According to this invention, in powder coating as well, metallicity as sufficient as that of a solvent-based or water-based paint could be obtained.

So long as the powder paint manufactured with the dry blending method is applied with the corona method, however, even an excellent pigment as such cannot solve the above-described problems specific to corona, and color unevenness is caused.

Patent Document 1: Japanese Patent Laying-Open No. 51-137725
Patent Document 2: Japanese Patent Publication No. 57-035214
Patent Document 3: Japanese Patent Laying-Open No. 09-071734
Patent Document 4: Specification of U.S. Pat. No. 4,138,511
Patent Document 5: WO02/094950
Patent Document 6: Japanese Patent Laying-Open No. 2001-029877
Patent Document 7: Japanese Patent Laying-Open No. 2003-213157
Patent Document 8: WO2005/007755

DISCLOSURE OF THE INVENTION

Problems to be Solved by the Invention

In the invention according to Patent Document 8 above, whether triboelectrification characteristics are observed or not was examined. As a result, sufficient triboelectrification characteristics were not observed and a preferred film could not be obtained. Here, simply adding alumina fine particles to the powder paint according to Patent Document 8 for the purpose of providing triboelectrification characteristics does not successfully bring about triboelectrification characteristics sufficient for coating.

Reasons why addition of a positive charging agent such as alumina fine particles does not successfully bring about triboelectrification characteristics as above seem to be as follows. Specifically, Japanese Patent Laying-Open No. 9-310034 describes in paragraph 0009 as follows: "In order to adhere alumina fine particles to surfaces of powder particles, the powder particles and the alumina fine particles should only be dry-blended in a mixer such as a Henschel mixer manufactured by Mitsui Miike Machinery Co., Ltd., a super mixer manufactured by Kawata Corporation, a V-type blender, a cone-type blender, or the like. It is noted that the alumina fine particle may simply be adhered to the surface of powder particle with the use of the dry-blender, or the alumina fine particle may partially be buried in and securely adhered to the surface of the powder particle. In order to partially bury the alumina fine particle in the surface of the powder particle and securely adhering the same thereto, a surface reformer for securely adhering the alumina fine particles while thermally softening the powder particles by applying impact force and compressive force to a mixture of the powder particles and the alumina fine particles can be used."

As can be clearly be seen from the description above, it is the positive charging agent that is charged through friction, and particles to which the positive charging agent has been adhered would behave as charged particles. On the other hand, if the positive charging agent does not adhere but comes off, triboelectrification characteristics cannot be obtained even though the positive charging agent (alumina fine particles in this case) is added. Therefore, efforts to bury and securely adhere the positive charging agent in and to the surfaces of particles are made even at the expense of a new additional step. When alumina fine particles are buried and securely adhered by applying impact force and compressive force to a flake pigment which is a high-brightness pigment, however, the flake pigment deforms and high brightness is lost. It is also possible to bond alumina fine particles to surfaces of flake particles through a process using a generally used binder such as a silane coupling agent, however, use of such a binder will cause sticking or aggregation of the flake particles, which is not preferred. Naturally, adoption of such a method leads to increase in industrial cost. Therefore, it has not been known to adhere a charging agent such as alumina fine particles to surfaces of flake particles, and basically it has been considered as impossible to adhere a charging agent.

In an attempt to simultaneously realize manufacturing with an inexpensive dry blending method as well as high brightness and uniformity (suppression of color unevenness) contributing to excellent design, the former can be realized to some extent based on Patent Document 8, however, it is difficult to realize the latter unless triboelectrification coating can be performed. Namely, in order to achieve both of high brightness and uniformity (suppression of color unevenness), it is necessary to provide the powder paint in Patent Document 8 with triboelectrification characteristics and development thereof has strongly been desired.

Therefore, a principal object of the present invention is to provide a flake pigment suitably used in a dry-blended powder paint manufactured with low cost, providing a film with excellent metallicity and high brightness, and further having suppressed color unevenness and stable triboelectrification characteristics.

In addition, another object of the present invention is to provide a powder paint providing a film with excellent metallicity and high brightness and further having stable triboelectrification characteristics.

Moreover, still another object of the present invention is to provide a powder-coated film free from color unevenness, having excellent metallicity and high brightness as a result of coating with a powder paint containing the flake pigment using a triboelectrification electrostatic coating apparatus as well as a painted product on which the film is formed.

Means for Solving the Problems

In order to solve the problems above, the present inventors have studied various devises and conducted dedicated research and development as to a composition of a resin composition covering surfaces of flake particles employed as base particles of a metallic pigment.

As a result, the present inventors have found that a flake pigment suitably used in a powder paint, providing a film with high brightness and further providing triboelectrification characteristics can be obtained by covering surfaces of flake particles with a coat containing a copolymer including a bond unit originating from a fluoric polymerizable monomer having fluorine and a bond unit originating from a polymerizable monomer having phosphate group and fixing specific fine particles with the coat being interposed. In addition, the present inventors have found that a powder-coated film and a painted product free from color unevenness, having excellent metallicity and high brightness can be obtained by coating with a powder paint containing such a flake pigment using a triboelectrification electrostatic coating apparatus, and completed the present invention.

Namely, a flake pigment according to the present invention includes a flake particle, a single-layer or multiple-layer coat covering a surface of the flake particle, and a fine particle, an outermost layer of the coat includes a copolymer including one or more type of first bond unit originating from a fluoric polymerizable monomer having fluorine and one or more type of second bond unit originating from a polymerizable monomer having phosphate group, and the fine particle is fixed with the outermost layer being interposed and has a characteristic to provide triboelectrification characteristics to the flake pigment.

Here, the copolymer may be a copolymer including the first bond unit, the second bond unit, and additionally one or more type of third bond unit originating from a polymerizable monomer.

In addition, the third bond unit may originate from styrene or methyl methacrylate. In addition, the fluoric polymerizable monomer having fluorine may be perfluorooctylethyl acrylate, and the polymerizable monomer having phosphate group may be 2-methacryloyloxyethyl acid phosphate or 2-acryloyloxyethyl acid phosphate.

Further, the content of the first bond unit may be in a range of 1 to 40 mol %, the content of the second bond unit may be in a range of 1 to 30 mol %, and a number average molecular weight may be in a range of 1000 to 500000 in the copolymer.

This copolymer may be a copolymer soluble in a solvent.

In the flake pigment according to the present invention, the fine particle providing triboelectrification characteristics may be an alumina fine particle and/or a titanium oxide fine particle.

The fine particle providing triboelectrification characteristics, that is fixed to the flake pigment according to the present invention may have an average particle size in a range from 5 nm to 1 μm and it may be fixed in a range from 0.1 to 10 mass % with respect to the flake particle.

The flake particle may be a flake particle composed of aluminum or an aluminum alloy.

Meanwhile, a powder paint according to the present invention is a powder paint containing the flake pigment and a thermosetting resin powder.

A powder-coated film and a painted product having the film formed thereon according to the present invention are obtained through a baking step after coating with the powder paint using a triboelectrification electrostatic coating apparatus.

In addition, a method of manufacturing the flake pigment according to the present invention includes the steps of adding the flake particle and the copolymer to a good solvent in which the copolymer is soluble, adsorbing the copolymer to the surface of the flake particle by kneading and mixing the flake particle and the copolymer in the good solvent, adsorbing the fine particle to a surface of the copolymer by adding the fine particle to the good solvent, and achieving stable fixation of the copolymer by adding the good solvent, together with a substance dispersed therein, to a poor solvent in which the copolymer is insoluble.

Effects of the Invention

With the structure as described above, the flake pigment according to the present invention is a flake pigment suitably used in a powder paint, providing excellent metallicity and high brightness to a film, and further providing stable triboelectrification characteristics, with color unevenness being suppressed.

Further, the powder paint according to the present invention is a powder paint providing excellent metallicity and high brightness to a film, further providing excellent adhesiveness, and further providing stable triboelectrification characteristics, with color unevenness being suppressed.

The powder-coated film and the painted product on which the film is formed according to the present invention are obtained through the baking step after coating with the powder paint using the triboelectrification electrostatic coating apparatus, and they are a film free from color unevenness having excellent metallicity and high brightness and a painted product on which the film is formed, respectively.

The foregoing and other objects, features, aspects, and advantages of the present invention will become more apparent from the following detailed description of the present invention.

BEST MODES FOR CARRYING OUT THE INVENTION

The present invention will be described hereinafter in further detail.

<Flake Pigment>

A flake pigment according to the present invention includes a flake particle, a single-layer or multiple-layer coat covering a surface of the flake particle, and a fine particle, an outermost layer of the coat includes a copolymer including one or more type of first bond unit originating from a fluoric polymerizable monomer having fluorine and one or more type of second bond unit originating from a polymerizable monomer having phosphate group, and the fine particle is fixed with the outermost layer being interposed and has a characteristic to provide triboelectrification characteristics to the flake pigment. Each component will be described hereinafter.

<Flake Particle>

Conventionally known flake particles known as base particles for the flake pigment may be used as flake particles employed for the present invention, without particularly limited. Examples include metal flakes of aluminum, zinc, copper, bronze, nickel, titanium, stainless, and the like, and alloy flakes thereof, and examples of non-metal flakes include pearl mica, transparent pearl mica, colored mica, interference mica, and the like.

Aluminum flakes or aluminum alloy flakes that are excellent in metallic luster, inexpensive, and easy to handle because of their small specific gravity are particularly suitable among these flake particles. Namely, particles composed of aluminum or aluminum alloy are particularly preferred as the flake particles to be employed in the present invention.

The flake particle employed for the present invention has an average particle size preferably from about 1 to 100 μm in general and more preferably from 3 to 60 μm. The flake particle has an average thickness of preferably about 0.01 to 5 μm in general and more preferably 0.02 to 2 μm.

When the average particle size exceeds 100 μm, the flake particles tend to project from the surface of a film and smoothness or sharpness of a coated surface tends to be low. When the average particle size is less than 1 μm, metallicity or brightness tends to be low. On the other hand, when the average thickness exceeds 5 μm, smoothness or sharpness of the coated surface tends to be low and manufacturing cost may be increased. When the average thickness is less than 0.01 μm, not only strength tends to be lower but also working during a manufacturing process may become difficult.

The average particle size of the flake particle is found by calculating a volume mean from particle size distribution measured with a known particle size distribution measuring method such as a laser diffraction method, a micromesh sieving method, a Coulter counter method, or the like. The average thickness is calculated from covering performance and density of flake particles.

In addition, in using aluminum flakes (flake particles composed of aluminum) as the flake particles in the present invention, the aluminum flakes may be obtained with any manufacturing method, without particularly limited. For example, the aluminum flakes may be obtained with a method of dry-grinding or wet-grinding atomized aluminum powders using a ball mill or the like. A grinding agent added in grinding may be adsorbed to surfaces of the aluminum flakes obtained with such a method. Examples of grinding agents include aliphatic acid (oleic acid or stearic acid), aliphatic amine, aliphatic amide, aliphatic alcohol, an ester compound, and the like. This grinding agent has an effect to suppress unnecessary oxidation of the aluminum flake surfaces and to improve gloss. A quantity of adsorption is preferably less than 2 parts by mass with respect to 100 parts by mass aluminum flakes. If the quantity of adsorption is equal to or greater than 2 parts by mass, surface gloss may be lowered.

In order to provide the flake particles employed for the present invention with various colors, various coloring agents or coloring pigments may be adhered to the surfaces of the flake particles.

Though a coloring agent or coloring pigment is not particularly limited, examples thereof include quinacridone, diketopyrrolopyrrole, isoindolinone, indanthrone, perylene, perynone, anthraquinone, dioxazine, benzoimidazolone, triphenylmethane quinophthalone, anthrapyrimidine, chrome yellow, phthalocyanine, phthalocyanine halide, azo pigments (azomethine metal complex, condensation azo and the like), titanium oxide, carbon black, iron oxide, copper phthalocyanine, condensation polycyclic pigment, and the like.

Though a method of adhering the coloring agent or the coloring pigment to the flake particles employed for the present invention is not particularly limited, a method of adhering the coloring pigment to the flake particles by covering the coloring pigment with a dispersant and thereafter stirring and mixing the same with the flake particles in a nonpolar solvent is preferable.

Aromatic carboxylic acid such as benzoic acid, vinyl benzoate, salicylic acid, anthranilic acid, m-aminobenzoic acid, p-aminobenzoic acid, 3-amino-4-methylbenzoic acid, 3,4-diaminobenzoic acid, p-aminosalicylic acid, 1-naphthoic acid, 2-naphthoic acid, naphthenic acid, 3-amino-2-naphthoic acid, cinnamic acid, or aminocinnamic acid; an amino compound such as ethylenediamine, trimethylenediamine, tetramethylenediamine, pentamethylenediamine, hexamethylenediamine, 1,7-diaminoheptane, 1,8-diaminooctane, 1,10-diaminodecane, 1,12-deaminododecane, o-phenylenediamine, m-phenylenediamine, p-phenylenediamine, 1,8-diaminonaphthalene, 1,2-diaminocyclohexane, stearyl propylenediamine, N-β-(aminoethyl)-γ-aminopropyl trimethoxysilane, or N-β-(aminoethyl)-γ-aminopropyl methyldimethoxysilane; aluminum; or a titanium chelate compound is preferably used as the dispersant above.

Similarly, interference films or the like can be formed on the surfaces of the flake particles, in order to provide the flake particles employed for the present invention with various colors. Though the method thereof is not particularly limited, for example, a method of forming an airing film on the surface by heating metal flakes in an atmosphere having a controlled oxygen content to about 300 to 700° C. or a method of covering a flake metal pigment with a precursor of an oxide of a transition metal or the like and thermally decomposing the same is preferable in order to form optically interferential oxide films on individual particle surfaces of the metal flakes.

The flake particles employed for the present invention may be composed of mica, surface-colored mica, glass flakes, surface-colored glass flakes, pearl, alumina flakes, colored alumina flakes, silica flakes, colored silica flakes, iron oxide flakes, graphite flakes, hologram pigment flakes, and a flake pigment composed of a cholesteric liquid crystal polymer, alone or in combination of at least two types, or in combination with the aforementioned metal flakes.

<Coat>

A coat according to the present invention covers a surface of the flake particle above, and it may be formed of a single layer or of multiple layers. The outermost layer of the coat is characterized by containing a copolymer including one or more type of first bond unit originating from a fluoric polymerizable monomer having fluorine and one or more type of second bond unit originating from a polymerizable monomer having phosphate group. Here, the outermost layer is a layer forming the surface of the coat, and in an example where the coat is formed of a single layer, that layer serves as the outermost layer.

On the other hand, when the coat is constituted of a plurality of layers, various layers can be included as other layers (layers other than the outermost layer), so long as the outermost layer has the structure above. For example, in order to provide the flake particle employed for the present invention with chemical resistance, water resistance or weather resistance, another resin layer can be formed between the outermost layer and the flake particle (preferably, the surface of the flake particle) if necessary. Though the method thereof is not particularly limited, a method of polymerizing a monomer and depositing a polymer on the surfaces of the metal flakes by adding a polymerizable monomer to slurry prepared by dispersing the flake particles in an organic solvent and adding a polymerization initiator such as azobisisobutylonitrile or benzoyl peroxide while heating the slurry in an inert gas atmosphere is preferable.

For example, acrylic acid, methacrylic acid, methyl methacrylate, butyl acrylate, 2-ethylhexyl acrylate, lauryl acrylate, stearyl acrylate, cyclohexyl acrylate, 2-hydroxyethyl acrylate, 2-hydroxybutyl acrylate, 2-methoxyethyl acrylate, 2-diethylaminoethyl acrylate, butyl methacrylate, octyl methacrylate, 1,4-butanediol diacrylate, 1,6-hexanediol diacrylate, 1,9-nonanediol diacrylate, neopentylglycol diacrylate, tripropyleneglycol diacrylate, tetraethyleneglycol diacrylate, trimethylolpropane triacrylate, tetramethylolmethane tetraacrylate, pentaerythritol triacrylate, trisacryloxyethyl phosphate, ditrimethylolpropane tetraacrylate, styrene, α-methylstyrene, vinyltoluene, divinylbenzene, acrylonitrile, methacrylonitrile, vinyl acetate, vinyl propionate, maleic acid, crotonic acid, itaconic acid, polybutadiene, linseed oil, soybean oil, epoxidized soybean oil, epoxidized polybutadiene, cyclohexene vinyl monoxide, divinylbenzene monoxide, or the like can be used as the aforementioned polymerizable monomer.

<Outermost Layer>

The outermost layer of the coat according to the present invention is characterized by containing a copolymer including one or more type of first bond unit originating from a fluoric polymerizable monomer having fluorine and one or more type of second bond unit originating from a polymerizable monomer having phosphate group. Here, the "bond unit" expressed as the first bond unit or the second bond unit in the present invention is a repeated unit forming a polymer such as a copolymer and it is a constituent unit originating from each monomer. In addition, "one or more type of first bond unit" means that one type or two or more types of bond unit(s) originating from a fluoric polymerizable monomer having fluorine is (are) contained in the copolymer (that is, the copolymer is generated by using one type or two or more types of fluoric polymerizable monomer(s) having fluorine), and "one or more type of second bond unit" means that one type or two or more types of bond unit(s) originating from a polymerizable monomer having phosphate group is (are) contained in the copolymer (that is, the copolymer is generated by using one type or two or more types of polymerizable monomer(s) having phosphate group).

The outermost layer of the coat according to the present invention may be composed only of such a copolymer or may contain other components, so long as they do not adversely affect effects of the present invention.

<First Bond Unit>

The first bond unit constituting the copolymer contained in the outermost layer of the present invention originates from a fluoric polymerizable monomer having fluorine. Here, the first bond unit plays a role of causing the flake particles to which this copolymer is adsorbed (that is, the flake particle covered with this copolymer) to float at the surface of the film through its poor affinity to other substances attributed to the fluoric polymerizable monomer having fluorine. According to this effect, the flake pigments can be arranged in parallel with the substrate, thereby attaining excellent metallicity.

Here, the fluoric polymerizable monomer having fluorine is a monomer capable of condensation polymerization or addition polymerization (radical polymerization, anion polymerization, cation polymerization, or ring-opening polymerization), and fluorine is contained in a copolymer molecule obtained as a result of polymerization. Fluorine may be contained in a main chain or in a side chain, and a place where it is present is not particularly limited.

In addition, such a fluoric polymerizable monomer having fluorine may be a cyclic polymerizable monomer or a polymerizable monomer having a straight chain.

Examples of a fluoric polymerizable monomer providing a copolymer having fluorine in a main chain include tetrafluoroethylene, chlorotrifluoroethylene, vinylidene fluoride, vinyl fluoride, hexafluoropropylene, hexafluoropropylene oxide, and the like.

Meanwhile, examples of a fluoric polymerizable monomer providing a copolymer containing fluorine in a side chain include methacrylic or acrylic ester of perfluoroalkyl alcohol or perfluoroalkyl vinyl ether, and specific examples thereof include trifluoroethyl methacrylate, 2,2,3,3-tetrafluoropropyl methacrylate, 2,2,3,4,4,4-hexafluorobutyl methacrylate, perfluorooctylethyl methacrylate, trifluoroethyl acrylate, 2,2,3,3-tetrafluoropropyl acrylate, 2,2,3,4,4,4-hexafluorobutyl acrylate, perfluorooctylethyl acrylate, perfluoropropyl vinyl ether, or the like, however, the present invention is not limited thereto.

In the present invention, among the fluoric polymerizable monomers having fluorine as above, perfluorooctylethyl acrylate is particularly preferably used. As a raw material for the fluoric polymerizable monomer having fluorine, $C_8F_{17}CH_2CH_2OH$ is most commercially available (heavily used, for example, in surfactant industries), and therefore it is readily available and relatively inexpensive among fluorine-containing compounds. A substance having C8 (carbon number 8) as a length of perfluoroalkyl group tends to exhibit a sufficient water-repellent and oil-repellent property and to facilitate handling, and hence it is most commercially available. In spite of short perfluoroalkyl group, an effect of the present invention can still be achieved, however, a water-repellent and oil-repellent property is weak and an effect to cause the flake particles to float at the surface of the film becomes weaker. Alternatively, when perfluoroalkyl group is too long, perfluoro group forms microcrystals, which gives rise to a problem in terms of manufacturing efficiency, such as poor solubility in a solvent.

<Second Bond Unit>

The second bond unit constituting the copolymer contained in the outermost layer of the present invention originates from a polymerizable monomer having phosphate group. Here, the second bond unit plays a role of adsorbing this copolymer to the flake particle through excellent adsorbability of the phosphate group. In addition, as this phosphate group is adsorbed to fine particles providing triboelectrification characteristics which will be described later, the fine particles providing triboelectrification characteristics can be fixed to the flake particle with this outermost layer being interposed. It is noted that the phosphate group exhibiting excellent adsorbability to the flake particle means that the flake particle can be covered with the copolymer through adsorption, and it is not necessary to apply a long reaction time or a complicated polymerization process for each type of flake particle to be covered, as compared with conventional polymeric resin coating methods. Thus, a process advantageous in terms of industrial manufacturing can be provided. Naturally, the flake particle may directly be covered with the copolymer with the polymeric resin coating method as in a conventional example.

Here, the polymerizable monomer having phosphate group is a monomer capable of condensation polymerization or addition polymerization (radical polymerization, anion polymerization, or cation polymerization), and copolymer molecules resulting from polymerization thereof contain phosphate group.

Examples of such a polymerizable monomer having phosphate group include a compound having at least one polymeric unsaturated bond and at least one phosphate group in the same molecule. More specifically, (meth)acryloyloxyalkyl acid phosphate such as 2-methacryloyloxyethyl acid phosphate, 2-acryloyloxyethyl acid phosphate, 2-acryloyloxypropyl acid phosphate, 2-methacryloyloxypropyl acid phosphate, 10-acryloyloxydecyl acid phosphate, or 10-methacryloyloxydecyl acid phosphate is preferable (alkyl chain: carbon number 2 to 20). Further, an equimolar adduct of glycidyl (meth)acrylate and monoalkyl (carbon number 1 to 20) phosphate can also be used as a phosphate-group-containing unsaturated monomer. The polymerizable monomer having phosphate group, however, is not limited thereto.

In the present invention, among the polymerizable monomers having phosphate group as above, 2-methacryloyloxyethyl acid phosphate or 2-acryloyloxyethyl acid phosphate may particularly be used. Regarding phosphate ester, it is difficult to synthesize a simple substance strictly consisting only of monoester and phosphate ester generally contains diester as an impurity. In the case of a polymerizable monomer, diester serves as a crosslinking agent and impedes solubility, which is not preferred. A compound having a simple chemical structure is relatively high in purity of monoester as an industrial product, and the monomer mentioned above satisfies such a condition. Considering combination with perfluorooctylethyl acrylate which is a fluoric polymerizable monomer, a monomer similar in polymerizable characteristics is advantageous taking into account homogeneity in polymerization, and in that sense, (meth)acrylic ester identical in polymerization activating site is preferred.

<Third Bond Unit>

The copolymer above may include the first bond unit above and the second bond unit above, and additionally one or more type of third bond unit originating from a polymerizable monomer.

Such a third bond unit is preferably contained in order to improve solubility of the copolymer in a solvent. Protons of OH provided in the phosphate group described previously are active protons, which seem to be extremely chain-transferable following radical polymerization. Therefore, if no polymerizable monomer constituting this third bond unit is present, radical growth terminals easily chain-transfer to the phosphate group of the already polymerized copolymer to form three-dimensional crosslinking, which leads to insolubility. Though this problem will be solved by employing polymerization other than radical polymerization such as ion polymerization, radical polymerization is preferable in consideration of simplicity of polymerization.

It is impractical to suppress insolubilization without coexistence of the polymerizable monomer constituting the third bond unit as described above in radical polymerization, because monomer concentration must extremely be lowered in polymerization and yield is also extremely reduced. The polymerizable monomer constituting such a third bond unit is utilized so as to obtain a copolymer insoluble even in radical polymerization, thereby also achieving practically tolerable yield.

A purpose to add such a polymerizable monomer constituting the third bond unit is to prevent insolubilization resulting from crosslinking as described above, and the polymerizable monomer is preferably a monomer (monofunctional monomer) having only one polymerization activating site in one molecule, similarly to monomers constituting the first bond unit and the second bond unit.

Examples of a monomer satisfying such conditions include ethylene, propylene, butene, isobutene, vinyl chloride, vinyl bromide, vinyliden chloride, acrylonitrile, methacrylonitrile, vinylidene cyanide, vinyl acetate, methyl acrylate, methyl methacrylate, acrylic acid, methacrylic acid, styrene, acrylamide, methyl vinyl ketone, phenyl vinyl ketone, methyl vinyl ether, phenyl vinyl ether, phenyl vinyl sulfide, N-vinylpyrrolidone, N-vinyl carbazole, and the like, however, the present invention is not limited thereto.

Among the monomers exemplified above, selection of styrene or methyl methacrylate is preferred. Namely, the third bond unit preferably originates from styrene or methyl methacrylate. As will be described later, in achieving stable fixation of the copolymer onto the surface of the flake particle, the copolymer is initially adsorbed to the surface of the flake particle in a good solvent and then slurry containing the flake particles to which the copolymer is adsorbed is dispersed in a poor solvent. On the other hand, a trace amount of the good solvent may remain in the poor solvent, and in that case, a trace amount of the good solvent is infiltrated in a polymer chain of the copolymer and serves as a type of plasticizer, which may cause lowering in Tg (glass transition point) of the copolymer. If Tg of the copolymer is lowered as such, what is called tackiness is exhibited at the surface of the resultant flake pigment and the flake pigments may stick to each other and aggregate. If the third bond unit above originates from styrene or methyl methacrylate in the present invention, homopolymers containing these monomers have high Tg. Therefore, in an example where at least one of styrene and methyl methacrylate is contained in the copolymer, if Tg is lowered due to an action of a good solvent as a plasticizer in such a condition that a trace amount of the good solvent is also present (though the manufacturing process according to the present invention will be described later, this case may occur in that process), exhibition of tackiness thereby is relatively less likely and sticking to each other and aggregation of the flake pigments can be lessened.

On the premise that radical polymerization occurs and the polymerizable monomer constituting the third bond unit is used, preferably, the copolymer described above contains the first bond unit above in a range from 1 to 40 mol % and the second bond unit above in a range from 1 to 30 mol %, and the copolymer has a number average molecular weight in a range from 1000 to 500000. It is noted that the contents of the first bond unit and the second bond unit can be regarded as the contents of the fluoric polymerizable monomer having fluorine and the polymerizable monomer having phosphate group, respectively.

Regarding each content above, the copolymer obtained by polymerization tends to become insoluble if the content exceeds the upper limit. Meanwhile, appearance of the film such as metallicity or brightness tends to remarkably lower if the content does not satisfy the lower limit. In addition, if the number average molecular weight above is less than 1000, adsorbability is lowered to remarkably lower metallicity of the film. If the number average molecular weight exceeds 500000, the flake pigments for which a coating process was completed tend to aggregate when dispersed in a poor solvent, which is inappropriate as a powder coating pigment.

<Characteristic or the Like of Copolymer>

The copolymer in the present invention is desirably soluble in a solvent when it covers the surface of the flake particle through adsorption as a surface treatment agent. Therefore, the fluoric polymerizable monomer having fluorine and the polymerizable monomer having phosphate group are each preferably a monomer (monofunctional monomer) having only one polymerization activating site in one molecule, and the obtained copolymer is desirably a linear skeleton polymer (a polymer not three-dimensionally crosslinked).

When a plurality of polymerization activating sites are present, the monomer is generally three-dimensionally crosslinked and it becomes insoluble in all solvents. Even when a plurality of polymerization activating sites are present, on condition that a molar fraction thereof is extremely low, the monomer becomes a branched skeleton polymer and a solvent in which the polymer is soluble may be available in this case. In that case, the monomer can be used in the present invention.

In the copolymer according to the present invention, a polymer skeleton structure such as a linear or branched structure is not particularly limited, and it is only necessary that a solvent in which the copolymer is soluble is present. The solvent is not particularly limited so long as the solvent does not influence the flake particle to be processed.

In the copolymer according to the present invention, such a structure that substituent group having fluorine is present as a side chain in the first bond unit and phosphate group is present as a side chain in the second bond unit is particularly preferred, from a point of view of improvement in solubility in a solvent.

<Method of Synthesizing Copolymer>

Though the aforementioned monomers may be copolymerized in order to synthesize the copolymer forming the outermost layer of the coat in the present invention, the polymerization method is not particularly restricted. Though examples of the polymerization method include addition polymerization (radical polymerization, cation polymerization, anion polymerization, or ring-opening polymerization) or condensation polymerization, radical polymerization is preferable because it can readily be achieved. Though radical polymerization includes various techniques such as bulk polymerization, solution polymerization, and emulsion polymerization, such a technique is not limited in the present invention.

The copolymer in the present invention, however, must be soluble in a solvent when it covers the surface of the flake particle through adsorption as a surface treatment agent, and homogeneous solution polymerization is recommended from this point of view. For further detailed description of the present invention, radical homogeneous solution polymerization including also the polymerizable monomer constituting the third bond unit will be described hereinafter by way of example.

Initially, on the premise that homogeneous solution polymerization is adopted, a solvent that can be used for polymerization should only be a solvent capable of dissolving all types of used monomers and the generated copolymer, and the solvent is not particularly limited. In general, a polymerizable monomer having phosphate group has high polarity and hence it is not readily dissolved in a nonpolar solvent. Therefore, ketones such as acetone, methyl ethyl ketone and cyclohexanone, esters such as ethyl acetate and methyl acetate, and alcohols having carbon number not more than 4 are preferable, however, the present invention is not particularly limited thereto. An amount of use of the solvent preferably corresponds to 5 to 50 mass % in terms of monomer concentration in the polymerization solution. Copolymer yield is extremely lowered if the amount of use is less than 5 mass %, whereas the copolymer gelates and easily becomes insoluble if the amount of use exceeds 50 mass %.

A polymerization initiator is not particularly limited so long as the polymerization initiator is soluble in a solvent selected in the above. Though examples of the polymerization initiator include azobisisobutylonitrile (AIBN), benzoyl peroxide (BPO), and cumene hydroperoxide, the present invention is not limited thereto.

The amount of use is not limited either, however, the amount of use is preferably in a range from 0.1 to 10 mass %. Copolymer yield is extremely lowered if the amount of use is less than 0.1 mass %, whereas the copolymer is oligomerized if the amount of use exceeds 10 mass %.

A proper range of a reaction temperature is determined, depending on a type of an initiator to be used. For instance, the aforementioned examples are initiators belonging to a category referred to as an intermediate temperature initiator, and a preferable reaction temperature ranges from 40 to 100° C. No polymerization proceeds if the reaction temperature is lower than 40° C., whereas the initiator is so quickly decomposed that control of reaction becomes difficult if the reaction temperature exceeds 100° C. Naturally, since a type of the initiator is not limited, the reaction temperature is not limited either.

A proper range of a reaction time is determined, depending on a type of an initiator and a reaction temperature. The half life of the initiator is univocally determined when the type of the initiator and the reaction temperature are determined. Here, 0.2 to 4 times the half life is preferable as the reaction time. Copolymer yield is remarkably lowered if the reaction time is less than 0.2 times the half life and the yield is not much increased if reaction is continued for a time period exceeding 4 times the half life, however, the present invention is not limited thereto.

In the present invention, a method of recovering and purifying the polymerized copolymer is not particularly limited either. The present invention can be achieved also with the use of a polymerization reaction solution which is not particularly purified. Though general re-precipitation, freeze drying, column separation, or extraction can be used for purification and recovery, re-precipitation is simple and hence preferable. The following description for illustrating the present invention in further detail is provided with reference to re-precipitation by way of example.

A poor solvent used for re-precipitation must not dissolve a generated copolymer. Further, a solvent that dissolves unreacted monomers is preferable. When a solvent not dissolving but precipitating or phase-separating unreacted monomers is used, a precipitated copolymer contains unreacted monomers, and hence the unreacted monomers must separately be extracted and removed by using a solvent not dissolving the generated copolymer but dissolving the unreacted monomers.

Though preferable examples of such solvents include alcohol having carbon number not more than 3 such as ethanol, methanol or propyl alcohol, as well as alkane such as hexane, heptane or Merveille (trade name), the present invention is not limited thereto. In particular, a solvent satisfying the aforementioned condition varies depending on a type of a monomer and hence the solvent cannot be limited.

A type and a quantity of the poor solvent used for re-precipitation and a quantity of an introduced copolymer solution must be controlled on a case-by-case basis in accordance with property, concentration or the like of a generated copolymer. The method of control is similar to that in general polymer re-precipitation purification.

<Fine Particle>

Fine particles used in the present invention are fixed with the outermost layer being interposed and have a characteristic to provide triboelectrification characteristics to the flake pigment. Here, to be fixed "with the outermost layer being interposed" means that the fine particles are securely adhered to the surface of the flake pigment with the outermost layer lying therebetween, and so long as at least some of fine particles are exposed through the outermost layer (exposed at the surface of the flake pigment), it may encompass such a condition that a part or the entirety of fine particles is buried in the outermost layer.

In the present invention, the purpose to fix the fine particles having a characteristic to provide triboelectrification characteristics to the flake pigment (hereinafter also simply referred to as the "fine particles providing triboelectrification characteristics") to the surface of the flake particle is to provide triboelectrification characteristics to the flake pigment. Therefore, the fine particles providing triboelectrification characteristics in the present invention are preferably a charging agent used generally in triboelectrification electrostatic coating, and alumina fine particles (aerogel) and/or titanium oxide fine particles are particularly suitably used in consideration of availability or the like. The present invention, however, is not limited as such. In addition, such fine particles as having a characteristic to provide triboelectrification characteristics to the flake pigment have an average particle size preferably in a range from 5 nm to 1 μm.

Though a method of fixing fine particles providing triboelectrification characteristics to the surface of the flake particle in the present invention will be described in detail later, fine particles providing triboelectrification characteristics in that process are dispersed in an organic solvent. When fine particles providing triboelectrification characteristics each have an average particle size smaller than 5 nm, the fine particles are not completely dispersed but they aggregate and form aggregated mass having an average particle size not smaller than 5 nm, which is in turn fixed. From a point of view of the purpose to provide triboelectrification characteristics, fixing of the aggregated mass can still fulfill the purpose. The lower limit of the range of the average particle size of fine particles providing triboelectrification characteristics suitably used in the present invention is not particularly restricted, however, setting the particle size less than 5 nm does not have significance. Meanwhile, the upper limit of the range of the average particle size is preferably not greater than 1 μm. When the average particle size exceeds 1 μm, mechanical strength in fixing to the surface of the flake particle is insufficient and fine particles providing triboelectrification characteristics may fall during use.

An amount of use of the fine particles providing triboelectrification characteristics in the present invention is preferably in a range from 0.1 to 10 mass % with respect to the flake particle. When the amount of use is less than 0.1 mass %, triboelectrification characteristics are not sufficiently provided. When the amount of use exceeds 10 mass %, brightness after the film is formed is lowered due to an effect of diffused reflection of light by the fine particles themselves providing triboelectrification characteristics.

<Principles in Covering Flake Particle Surface With Copolymer and Fixing of Fine Particles>

Prior to specific explanation of a method of covering the surface of the flake particle with the copolymer according to the present invention and a method of fixing the fine particles having a characteristic to provide triboelectrification characteristics to the flake pigment, principles thereof will be described. Initially, in a solvent in which a copolymer is soluble, the flake particles and the dissolved copolymer are brought into contact with each other. Then, phosphate group in the copolymer is adsorbed to the surface of the flake particle. Though copolymer molecules are localized at the surface of the flake particle in such a state, a portion other than the adsorbed portion (hereinafter referred to as an "adsorbed unit") is about to be dissolved in the solvent. Therefore, the flake particle is not completely covered with a solid coat of the copolymer. This state is referred to as "adsorption" or "adsorbed state" for the sake of convenience. The adsorbed unit of the phosphate group of the copolymer in this adsorbed state is in an adsorption equilibrium state in which adsorption and desorption are repeated. When a dispersion in which fine particles providing triboelectrification characteristics are dispersed in the same solvent is added in this state, a part of an unadsorbed unit (that is, an adsorbable site of the phosphate group not adsorbed to the flake particle) other than the adsorbed unit of the phosphate group of the copolymer in the state adsorbed to the flake particle is adsorbed to the fine particles providing triboelectrification characteristics, so that the fine particles providing triboelectrification characteristics are localized at the surface of the flake particle with the copolymer being interposed.

In the adsorbed state in which the copolymer is adsorbed to the flake particle and the fine particles providing triboelectrification characteristics, the copolymer is in a semi-dissolved state. When this semi-dissolved copolymer is introduced in a solvent in which the copolymer is insoluble (a poor solvent), the solvent composition is varied and the copolymer is precipitated as a solid, which is called "stable fixation" for the sake of convenience. In achieving stable fixation, it is important to introduce the flake particles to which the copolymer is adsorbed and the fine particles providing triboelectrification characteristics in the sufficiently stirred poor solvent, in order to avoid bonding between the flake particles to which the copolymer has been adsorbed with the copolymer lying therebetween and to achieve stable fixation in the dispersed state. By performing an operation for stable fixation, the copolymer becomes a solid coat and covering of the surface of the flake particle and fixing of the fine particles providing triboelectrification characteristics are completed. Namely, as a result of this operation for stable fixation, the fine particles providing triboelectrification characteristics are fixed with the copolymer forming the outermost layer of the coat covering the flake particle being interposed. Though some fine particles providing triboelectrification characteristics are fixed between the copolymer and the flake particle or in the copolymer, most of them are fixed with the copolymer forming the outermost layer of the coat covering the flake particle being interposed. Namely, the structure is such that the fine particles providing triboelectrification characteristics are present at the surface of the outermost layer formed on the flake particle. According to such a structure, the fine particles providing triboelectrification characteristics present at the surface of the outermost layer formed on the flake particle are rubbed against Teflon (trademark) in a tribo gun of the triboelectrification electrostatic coating apparatus serving to charge a powder paint to generate charges, and consequently triboelectrification characteristics are provided to the flake pigment of the present invention. Therefore, when the fine particles providing triboelectrification characteristics are not present at the surface of the outermost layer formed on the flake particle and when they are fixed only between the copolymer and the flake particle or in the copolymer, the fine particles providing triboelectrification characteristics cannot be rubbed against Teflon (trademark) and charges are not generated, which results in failure in providing triboelectrification characteristics.

As can clearly be understood from these principles, the order of mixing a copolymer solution, flake particles, and fine particles providing triboelectrification characteristics is critical. If fine particles providing triboelectrification characteristics are first mixed with a copolymer solution, the fine particles providing triboelectrification characteristics aggregate with each other with the copolymer being interposed and they are precipitated. Alternatively, if flake particles and fine particles providing triboelectrification characteristics are mixed and then a copolymer solution is added and mixed thereinto, aggregation and precipitation of fine particles providing triboelectrification characteristics locally occurs and a homogenous process cannot be achieved. In order to complete the present invention, it is absolutely necessary to initially mix the copolymer solution and the flake particles with each other, thereafter mix the fine particles providing triboelectrification characteristics, and finally achieve stable fixation.

As described previously, if fine particles providing triboelectrification characteristics and target particles are simply mixed with each other in order to adhere the fine particles to the target particles, the fine particles providing triboelectrification characteristics may sometimes adhere to target particles (particles to which triboelectrification characteristics are to be provided) to successfully provide triboelectrification characteristics thereto but sometimes it may not be successful. In the case of the flake particles (the target particles) in the present invention, it is clear from Examples and Comparative Examples which will be described later that the latter is the case. If mixing for adhesion alone is not sufficient, a burying and securely adhering method as described previously can be adopted. In the case of the flake pigment according to the present invention which is a high-brightness pigment, however, the flake pigment deforms as a result of application of impact force and compressive force in this method and high brightness is lost. Alternatively, as in Japanese National Patent Publication No. 2007-524733, in the case of a method of using a binder such as a silane coupling agent for fixing fine particles providing triboelectrification characteristics to target particles, it is impossible to selectively bond the flake particles which are the target particles to the fine particles providing triboelectrification characteristics, and sticking of the flake particles to each other, that is, aggregation, also occurs. Namely, this method cannot be adopted.

The problem above does not arise in the present invention, because the copolymer according to the present invention is localized in a manner adsorbed on the outermost surface of the flake particle and fine particles providing triboelectrification characteristics are added at that timing, and because the flake particle to which the copolymer is adsorbed and fine particles providing triboelectrification characteristics are introduced in a sufficiently stirred poor solvent, to thereby achieve stable fixation in a dispersed state.

<Method of Adsorption of Copolymer (Outermost Layer) to Flake Particle Surface>

Initially, the copolymer obtained as described previously is dissolved in a solvent in which the copolymer is soluble, which is added to the flake particles followed by kneading and mixing. When an unpurified polymerization reaction solution of the copolymer is employed as it is, the polymerization reaction solution may be added as it is or may be added as diluted with a dilution solvent. Here, the flake particles may be in a form of solventless powders or paste containing a solvent. An amount of the added copolymer is preferably in a range from 0.1 mass % to 10 mass % with respect to the flake particle. The effects of the invention are not sufficiently exhibited if the amount of addition is less than 0.1 mass %. On the other hand, if the amount exceeds 10 mass %, aggregation tends to occur in a subsequent pulverization step and it is difficult to obtain a useful powder metallic pigment. The amount of the added copolymer, however, is not limited thereto. The solvent is not particularly limited so long as the solvent dissolves the copolymer and exerts no influence on the flake particles.

The quantity of use of the solvent is preferably in a range from 10 mass % to 400 mass % with respect to the flake particle (non-volatile). Homogeneous kneading and mixing is difficult if the quantity is less than 10 mass %, whereas the poor solvent must be used in a large quantity in a dispersion step which will be described later if the quantity exceeds 400 mass %. When the paste containing the solvent is used for raw flake particles, however, a necessary quantity of the solvent must be calculated with attention. Since the copolymer solution and the paste of the flake particles are kneaded and mixed with each other, the solvent forms a mixed solvent in a mixture system. If this mixed solvent does not have such a composition as dissolving the copolymer, the copolymer precipitates during kneading and mixing, to thereby inhibit homogeneous adsorption. Therefore, the quantity of use of the solvent cannot unconditionally be limited.

Phosphate group portions in copolymer molecules seem to adsorb to the flake particle in the aforementioned kneading and mixing step. Though adsorption can probably be further ensured by such a technique as aging slurry (slurry in which the copolymer is adsorbed to the flake particle) or warm kneading and mixing or warm aging after completion of kneading and mixing, the effects of the present invention are exhibited without a special operation, and hence the present invention is not limited in particular.

<Method of Adding Fine Particles Providing Triboelectrification Characteristics>

Fine particles providing triboelectrification characteristics to be added to the slurry in which the copolymer is adsorbed to the flake particle above may be added in a solid state, however, it is recommended to add the fine particles as a dispersion in which the fine particles are dispersed in a solvent. A solvent for dispersion is not particularly defined, however, a good solvent for the copolymer is preferred. When a poor solvent is used, that solvent can be used only in such an amount that a solvent in a final mixing system has a composition that the copolymer is soluble. As described previously, alumina fine particles (alumina aerogel) or titanium oxide fine particles are suitably used as the fine particles providing triboelectrification characteristics. In this case, however, as a result of aggregation, the fine particles providing triboelectrification characteristics each have an average particle size in a range from ten or more to several ten μm. For complete dispersion, therefore, use of a solvent is indispensable. In dispersing fine particles in the solvent, use of a high-speed stirring disperser such as a paint disperser or dispersion using ultrasound is recommended, however, the dispersion method is not limited as such.

A method of adding fine particles providing triboelectrification characteristics or a dispersion of fine particles to the slurry in which the copolymer is adsorbed to the flake particle above is not particularly limited, however, gradually adding the flake particle slurry while kneading and mixing the same is recommended, from a point of view of homogeneity. It seems that a phosphate group portion in a copolymer molecule is adsorbed to fine particles providing triboelectrification characteristics during the kneading and mixing step. Though adsorption can probably be further ensured by such a technique as aging slurry or warm kneading and mixing or warm aging after completion of kneading and mixing, the effects of the present invention are exhibited without a special operation, and hence the present invention is not limited in particular.

<Method of Stable Fixation and Pulverization>

In order to achieve stable fixation of the copolymer contained in the slurry (the slurry in which the copolymer is adsorbed to the flake particle and also to fine particles providing triboelectrification characteristics), a technique for dispersing the slurry in the poor solvent, filtrating the dispersion and drying the filtered-out substance is recommended. If this slurry is dried as it is, the flake particles stick to each other and aggregate. Though the flake particles can sufficiently be utilized after they are crushed again, this also leads to such a disadvantage that the flake particles are partially deformed in crushing or the fine particles providing triboelectrification characteristic are desorbed. Though the aforementioned problem of aggregation can be avoided by cleaning the flake particles with a good solvent followed by drying, the adsorbed copolymer is also gradually washed away and the effects of the present invention are also gradually lessened.

The aforementioned problem can be avoided by gradually introducing the slurry into a large quantity of strongly stirred poor solvent and filtrating and drying the same. In other words, the flake particles are dispersed in the dispersion solvent and do not come in contact with each other. At the same time, the poor solvent extracts the good solvent and the adsorbed copolymer is precipitated on the surface of the flake particle as a solid, and hence the particles do not stick to each other when they contact with each other again. Alkane such as hexane, heptane or Merveille (trade name) is preferable as the poor solvent in this case.

The slurry of which stable fixation process has ended is filtered, dried and pulverized. The drying method here is not particularly limited, however, in consideration of industrial safety and productivity, drying with a vacuum heating vibration drier, a vacuum heating stirring drier or the like is preferred.

As described above, in summary, the method of manufacturing a flake pigment according to the present invention preferably includes the steps of adding flake particles and a copolymer in a good solvent capable of dissolving the copolymer, adsorbing the copolymer to the surface of the flake particle by kneading and mixing the flake particles and the copolymer in the good solvent, adsorbing the fine particles to the surface of the copolymer by adding the fine particles to the good solvent, and achieving stable fixation of the copolymer by adding the good solvent, together with substances dispersed therein, to a poor solvent that does not dissolve the copolymer.

<Powder Paint>

The powder paint according to the present invention contains the flake pigment according to the present invention and thermosetting resin powders that have triboelectrification characteristics or can be used for triboelectrification coating after addition of a charging agent such as alumina.

The powder paint containing the flake pigment covered with the copolymer according to the present invention includes thermosetting resin powders. The thermosetting resin powders are not particularly restricted so long as they have triboelectrification characteristics or they can be used for triboelectrification coating after addition of such a charging agent as alumina. Thermosetting resin powders having a resin composition containing a resin molten by heating and thereafter quickly hardened and exerting no influence on the copolymer according to the present invention can be employed.

In other words, known thermosetting resin powders for powder coating can particularly preferably be employed as the thermosetting resin powders used for the present invention. Specific examples include powders having a resin composition containing acryl resin or polyester resin. A hardener, a dispersant or the like may be added to the thermosetting resin powders used for the powder paint according to the present invention if necessary.

The hardener that can be added to the thermosetting resin powders used for the present invention is not particularly limited, and a known hardener can be used. Specific examples of the hardener include amine, polyamide, dicyandiamide, imidazole, dihydrazide carboxylate, acid anhydride, polysulfide, boron trifluoride, amino resin, triglycidyl isocyanate, primide, epoxy resin, other dibasic acids, imidazoline, hydrazide, and an isocyanate compound. This hardener can be employed alone or in combination of at least two types. Further, this hardener can be employed along with an accelerator if necessary.

The dispersant that can be added to the thermosetting resin powders used for the present invention is not particularly limited, and a known dispersant can be used. Specific examples of the dispersant include a surface active agent such as ester phosphate, amine, polyoxyethylene alkyl ether, polyoxyethylene alkyl phenyl ether, and the like. This dispersant may be employed alone or in combination of at least two types.

In addition to the above, various fillers such as calcium carbonate, barium sulfate and talc, various flowability regulators such as silica, alumina and aluminum hydroxide, various colorants such as titanium oxide, carbon black, iron oxide, copper phthalocyanine, azo pigment, and condensation polycyclic pigment, various leveling agents such as acryl oligomer and silicone, various foaming inhibitors such as benzoin, various additives such as waxes, coupling agents, an antioxidant, and magnetic powders, and various functional materials may further be added to the thermosetting resin powders used for the powder paint according to the present invention if necessary.

Though not particularly limited, the average particle size of the thermosetting resin powder used for the powder paint according to the present invention is preferably at least 5 μm and more preferably at least 15 μm in particular. Further, this average particle size is preferably not greater than 100 μm and more preferably not greater than 60 μm in particular. If this average particle size is less than 5 μm, homogenous dusting is so difficult in powder coating that a lump of resin may adhere to a painted plate and smoothness may be lost. If this average particle size exceeds 100 μm, smoothness of the surface of a powder-coated film may be lowered and good appearance may not be obtained.

In the powder paint according to the present invention, the content of the flake pigments according to the present invention is preferably at least 1 part by mass with respect to 100 parts by mass thermosetting resin powders used for the present invention, and more preferably at least 2 parts by mass in particular. Further, this content is preferably not more than 40 parts by mass and more preferably not more than 20 parts by mass in particular. If this content is less than 1 part by mass, no sufficient metallicity and brightness may be obtained and the film tends to have to have a larger thickness for covering the substrate. If this content exceeds 40 parts by mass, the cost tends to increase, smoothness of the film tends to be lost and the appearance tends to deteriorate.

When the flake pigment according to the present invention is used as the powder paint, the dry blending method is excellent in terms of cost as the method for manufacturing the powder paint, however, other methods such as the bonded method are not excluded. Therefore, in evaluating the flake pigment according to the present invention as the flake pigment for a powder paint, a painted plate can be obtained by simply dry-blending the flake pigments with thermosetting resin powders for powder coating and then performing powder coating. Meanwhile, the flake pigment can also be used for powder coating as a bonded paint by performing a bonded operation. Though a method, for example, as proposed by the present inventors (see Patent Document 5) is recommended for manufacturing the bonded paint, the present invention is not limited thereto.

Namely, a binder having viscosity and dissolved in a solvent is added to and kneaded and mixed with thermosetting resin powders and the flake pigment homogeneously mixed in advance with each other. Kneading and mixing is continued until the solvent is evaporated and the entire mixture becomes powdery. After the solvent is completely removed, classification is performed through an air sifter (screen) for obtaining a powder paint for metallic coating. Bonding strength between the flake pigment and the thermosetting resin powders can be increased by using the binder, and blocking between thermosetting resin powders can be suppressed by simultaneously performing kneading and mixing and distillation of the solvent. Though it is also possible to continuously perform the step of homogeneously mixing the flake pigment and the thermosetting resin powders with each other and the subsequent step of kneading and mixing and drying the binder having viscosity in the same apparatus such as a vacuum kneader-mixer, the homogeneous mixing step and the step of kneading and mixing and drying the binder can also separately be performed for improving productivity. In this case, a high-speed mixer such as a normal pressure kneader-mixer, a double-screw kneader, a Henschel mixer, or a super mixer, a blender, or the like can be used as a mixer, and a vibration dryer, a continuous fluid dryer or the like can be used as a kneader-mixer-dryer.

The solvent may be evaporated by adding a substance obtained by dispersing the flake pigments in the binder having viscosity and dissolved in the solvent in advance to the thermosetting resin powders and performing mixing and stirring.

The solvent for dissolving the binder having viscosity is not particularly limited, however, the solvent must not dissolve and swell the thermosetting resin powders and it desirably has a low boiling point. Thermosetting resin powders for powder coating are generally dissolved at 50° C. to 80° C., and hence a low-boiling-point solvent which can be distilled away at a temperature lower than the melting temperature of the thermosetting resin powders is preferable. Particularly preferably, further, the solvent is desirably completely removable under vacuum at 40 to 50° C. Examples of a solvent meeting this requirement include alkanes such as hexane, heptane and octane, alcohols such as methanol, ethanol and propanol, organic halides such as carbon tetrachloride, and water.

The flake pigments mixed with the thermosetting resin powders may be blended in an amount of about 1 to 40 parts by mass in general, particularly 2 to 20 parts by mass per 100 parts by mass thermosetting resin powders. No sufficient metallicity and brightness may be obtained if the content of the flake pigments is less than 1 part by mass. Further, the thickness of the paint must be increased in order to cover the substrate. If the content of the flake pigments exceeds 40 parts by mass, the manufacturing cost is increased, smoothness of the film is lost and appearance is deteriorated.

The quantity of the added binder having viscosity is set to 1 to 5 mass % with respect to the obtained powder paint. When the quantity is less than 1 mass %, bonding is so insufficient that free flake pigments remain in a large quantity. When the quantity exceeds 5 mass %, blocking is remarkable.

Though the quantity of the solvent for dissolving the binder is not particularly limited, it is preferably in a range from 2 to 50 mass % of mixed wet powders (containing thermosetting resin powders, the flake pigments, the binder having viscosity, and the solvent). When the quantity is less than 2 mass %, it is difficult to homogeneously mix the binder solution with the thermosetting resin powders and the whole flake pigments. When the quantity exceeds 50 mass %, the mixed powders form fluidic slurry and it is difficult to dry the slurry.

<Coating Method and Painted Product>

Regarding a method of applying the powder paint according to the present invention, it is preferable to perform blasting on the surface of a material to be coated in advance, to perform known treatment such as chemical conversion and then to adhere the powder paint, followed by heating and hardening.

A material to be coated (substrate) is not particularly restricted, however, it preferably experiences neither deformation nor degeneration during baking. Preferable examples of the material include a known metal such as iron, copper, aluminum, and titanium, and various alloys. In a specific form, the material is used, for example, for an automobile body, stationery, a domestic appliance, sporting goods, a building material, or an electric product.

A triboelectrification electrostatic powder coating method in which coating is performed by using a triboelectrification electrostatic coating apparatus is applicable as a method of adhering the powder paint according to the present invention to the surface of the substrate. Generally, when a value of a charge release current from a triboelectrically charged wall to the ground is in a range from 3 to 5 μA, triboelectrification coating can be performed. If triboelectrification is difficult to achieve, however, approximately 0.2 weight % alumina aerogel with respect to the paint may be dry-blended.

Though a heating temperature can be set as appropriate in accordance with a type of thermosetting resin powders to be used, it may be set to at least 120° C. in general and preferably to 150 to 230° C. Though a time period for heating can be selected as appropriate in accordance with a heating temperature, it may be set to at least 1 minute in general and preferably to 5 to 30 minutes. A film formed by heating has a thickness of about 20 to 100 μm in general, although this is not limited.

Thus, the present invention is also directed to a powder-coated film obtained by applying the powder paint with a triboelectrification electrostatic coating apparatus and by performing a baking step. In addition, the present invention is also directed to a painted product having such a powder-coated film formed thereon.

In the description above, the flake pigments (and the powder paint containing the same) according to the present invention are suitably used in a triboelectrification electrostatic coating method, however, the flake pigments (and the powder paint containing the same) according to the present invention may also be used in a corona electrostatic coating method.

EXAMPLES

The present invention will specifically be described hereinafter with reference to Examples and Comparative Examples, however, the present invention is not limited to these Examples.

<Evaluation Method>
<Concentration of Flake Pigment in Powder-Coated Film>

In coating, concentration of the flake pigments was determined in such a manner that two or more painted plates painted as similarly as possible were fabricated, one of them was subjected to total sampling and analysis before baking of the deposited powder paint, and hence other painted plates were assumed to also have the same concentration of flake pigments. Namely, approximately 1 g sampled, deposited powder paint was accurately measured and dissolved in N-methylpyrrolidone (NMP). The liquid in which the powder paint was dissolved was filtered through a filter paper accurately measured in advance, followed by sufficient washing with NMP to completely wash away thermosetting resin powders in the powder paint. Thereafter, acetone was used to substitute the solvent, the filter paper and a filtered-out substance were dried in an oven at 105° C. for two or more hours and then subjected to accurate measurement. The concentration of the flake pigments in the powder-coated film was determined based on (accurately measured value of the dried substance−accurately measured value of the filter paper)/accurately measured value of the sample×100(%). The result is shown in the field of "Concentration of Flake Pigment in Film" in Table 1 below.

It is noted that the outermost layer of the flake pigment (only the outermost layer even in an example where a plurality of coats are formed) is dissolved in NMP. An amount of the dissolved outermost layer, however, is extremely smaller than a mass of the thermosetting resin powders, and hence the concentration determined as described above can be regarded as the concentration of the flake pigments.

<Brightness>

In the present invention, brightness and metallicity of the powder-coated film were evaluated using an evaluation parameter $\beta/\alpha$. If aluminum flakes are used as the flake particles for fabricating a silver-metallic film containing no coloring pigment or the like, desirably, the relation of $\beta/\alpha \geq 110$ is satisfied. This evaluation parameter $\beta/\alpha$ is derived from the following equation (1):

$$L = [\beta/(\theta^2+\alpha)] + \gamma \qquad \text{Equation (1)}$$

where L represents a brightness exponent (L*a*b* color measuring system (colorimetric system based on the uniform color space set by CIE in 1976)) color-measured at an observation angle θ with a spectrophotometer (trade name "X-Rite MA68" manufactured by X-Rite), θ represents an observation angle, and α, β and γ represent constants.

The first term on the right side of the equation (1) corresponds to directional scattering specific to the metallic dependent on observation angle θ and the second term thereof corresponds to isotropic scattering independent of observation angle θ. Visual brightness well correlates to value L on a regular reflection position (θ=0) of directional scattering, i.e., $\beta/\alpha$, and hence $\beta/\alpha$ is used as the evaluation parameter for brightness.

In relation to calculation of $\beta/\alpha$, α, β and γ must first be determined. In the present invention, actually measured values L at observation angles θ of 15 degrees, 25 degrees, 45 degrees, 75 degrees, and 110 degrees are first measured for determining α, β and γ with the least-squares method on the assumption that the values of θ and L follow the equation (1). The results are as shown in Table 1 below.

<Color Unevenness>

Color unevenness of the powder-coated film in the present invention is visually examined in a sensory test. One painted plate to be evaluated is categorized into five grades, depending on a degree of color unevenness, and groups less in color unevenness are sequentially given 5 points, 4 points, 3 points, 2 points, and 1 point, respectively (painted plates determined as equal in color unevenness level are given the same score(s)). Five examiners conducted categorization and average scores were regarded as results of evaluation of color unevenness. The results are shown in Table 1 below.

<Synthesis of Copolymer According to the Present Invention>

In a separable flask of 1 liter, 60.3 g perfluorooctylethyl acrylate (trade name "LIGHT ACRYLATE FA-108" manufactured by Kyoeisha Chemical Co., Ltd.) to serve as a fluoric polymerizable monomer having fluorine and forming the first bond unit, 8.2 g 2-methacryloyloxyethyl acid phosphate (trade name "LIGHT ESTER P-1M" manufactured by Kyoeisha Chemical Co., Ltd.) to serve as a polymerizable monomer having phosphate group and forming the second bond unit, 57.9 g methyl methacrylate to serve as a polymerizable monomer forming the third bond unit, and 430 g cyclohexanone were introduced and stirred well for forming a homogeneous solution. After the inside of the system was sufficiently replaced with nitrogen, heating was performed to raise a temperature to 70° C. A solution in which 1.1 g AIBN to serve as a polymerization initiator was dissolved in 21.2 g cyclohexanone was added, followed by stirring for reaction. Three hours after addition of AIBN, 11.4 g methyl methacrylate was added, and six hours after that, 12.3 g methyl methacrylate was further added. After addition of AIBN, the solution was left for reaction at 70° C. for 20 hours, followed by cooling for stopping reaction. Then, 1.5 g 2,6-di-tert-butyl-p-cresol was added as a polymerization inhibitor and a solution containing an unpurified copolymer (hereinafter referred to as a "copolymer A solution" and the copolymer contained therein being referred to as a "copolymer A") was obtained.

In a polypropylene cup (hereinafter referred to as a "PP cup") of 2-liter volume, 1700 ml ethanol was introduced followed by strong stirring, to which 20.1 g copolymer A solution was gradually added. Then, the copolymer component was precipitated again and the solution became clouded. The clouded liquid was equally divided into four 500-ml PP cups. Since the copolymer adhered to the inner wall of the 2-liter PP cup can be scraped away with a spoon, the copolymer is recovered and introduced in the aforementioned clouded liquid. The 500-ml PP cups each containing the clouded liquid were placed in a centrifugal separator for centrifugal separation. Then, the clouded liquid was separated into a transparent supernatant and a doughy precipitate.

The doughy precipitate was taken out and dissolved in approximately 25 g acetone (hereinafter referred to as a "copolymer B solution"). In a PP cup of 2-liter volume, 1500 ml hexane was introduced followed by vigorous stirring, to which the copolymer B solution was gradually added. Then, the copolymer was again precipitated. This solution was filtered, and the filtered-out substance was washed with hexane followed by drying. Then, the weight was measured. As a result, 3.7 g copolymer was obtained. It was found from this result that the copolymer component in the copolymer A solution was 18.2 mass %.

As a result of measurement of a molecular weight of copolymer A purified through GPC (gel permeation chromatography), copolymer A had a number average molecular weight of 60000 in polystyrene equivalent. An amount of phosphorous and an amount of fluorine were quantitatively analyzed with ICP and ion chromatography respectively, and compositions of the first bond unit and the second bond unit in the copolymer were determined. As a result, 14 mol % first bond unit and 5 mol % second bond unit were determined.

Example 1

A paste containing flake particles (trade name "7640NS" manufactured by Toyo Aluminium Kabushiki Kaisha; containing aluminum flakes each having an average particle size of 17 μm and an average thickness of 0.4 μm as the flake particles) was charged in a filtering apparatus and the paste was washed with mineral spirit twice as much in amount as the paste. After sufficient filtration, kneading and mixing by using a kneader-mixer was performed for five minutes, a part of the paste was taken out, and a non-volatile component was quantified. Then, the non-volatile component occupied 80.3%. Then, 373.8 g washed paste was charged in the kneader-mixer, to which 195.8 g cyclohexanone was added, and the paste was kneaded and mixed until it became homogenous.

Then, 25.7 g copolymer A solution above was diluted with 502 g cyclohexanone, which was gradually added to the slurry above being kneaded and mixed. After addition, kneading and mixing was further continued for 20 minutes so that the copolymer in the copolymer A solution was adsorbed to the flake particles.

Then, 181.3 g cyclohexanone was added to 3.0 g alumina aerogel (trade name "AEROXIDE Alu C" manufactured by degussa; average particle size of 13 nm) which is alumina fine particles serving as fine particles providing triboelectrification characteristics, and dispersion was carried out by using a chip-type ultrasound generator until no lump (a substance that has not yet been dispersed) is present. This dispersion was gradually added to the slurry above being kneaded and mixed, and after addition was completed, kneading and mixing was further continued for 20 minutes so that the alumina fine particles were adsorbed to the surfaces of the flake particles with copolymer A being interposed.

In a stainless beaker of 5 liters, 2400 g n-heptane was charged followed by vigorous stirring in a stirrer, to which the slurry above was gradually added for stable fixation. The slurry was filtered, and 1200 g n-heptane was poured over the filtered-out substance for washing. In addition, 1200 g n-hexane was poured for solvent substitution, and the filtered-out substance was spread in a vat for natural drying overnight. The dried sample was passed through a 100 μm-mesh screen, to thereby obtain the flake pigments of the present invention.

Comparative Example 1

Processes the same as in Example 1 were performed to obtain the flake pigment in the Comparative Example, except that alumina aerogel, which is alumina fine particles serving as fine particles providing triboelectrification characteristics, was not added.

Comparative Example 2

Instead of the flake pigment in Example 1, a flake pigment (trade name "PCF7640A" manufactured by Toyo Aluminium Kabushiki Kaisha; an average particle size of 21 μm and an average thickness of 0.6 μm) containing aluminum flake as the flake particle and having a single-layer coat, which is not an outermost layer as in the present invention, on the surface of the aluminum flake was employed. This flake pigment is a conventional flake pigment product for powder coating.

<Observation of Flake Pigment>

Figure 1:
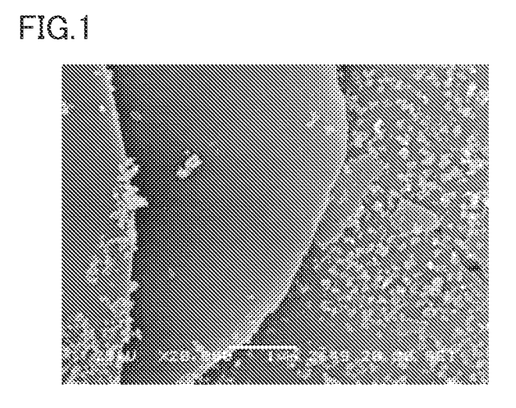
FIG. 1 is an electron micrograph obtained by photographing a surface of a flake pigment according to the present invention.
Figure 2:
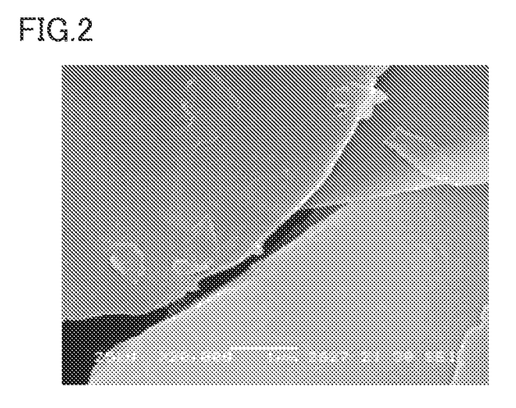
FIG. 2 is an electron micrograph obtained by photographing a surface of a flake pigment according to a Comparative Example.
Figure 3:
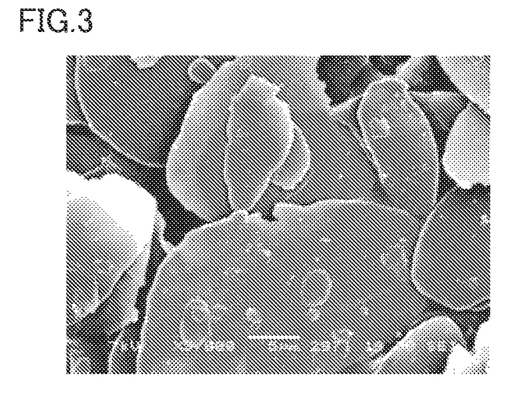
FIG. 3 is an electron micrograph obtained by photographing a state that an alumina aerogel was dry-blended in a flake pigment according to the Comparative Example.
Figure 4:
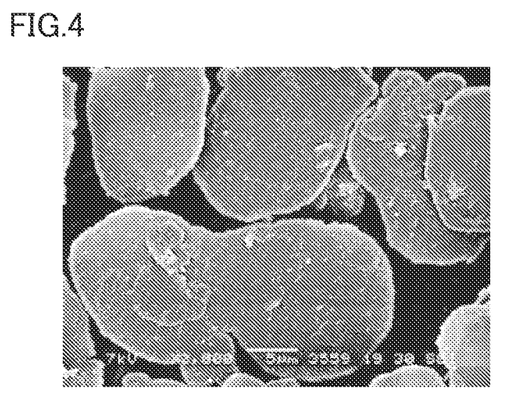
FIG. 4 is an electron micrograph obtained by photographing a state that an alumina aerogel was dry-blended in a flake pigment according to another Comparative Example.

FIG. 1 shows an electron micrograph of a surface of a flake pigment obtained in Example 1, and FIG. 2 shows an electron micrograph of a surface of an aluminum pigment obtained in Comparative Example 1. It can be seen well in FIG. 1 that fine particles providing triboelectrification characteristics are fixed to the surface of the flake pigment (a large number of small white points having no regular shape in FIG. 1 are fine particles providing triboelectrification characteristics). FIG. 3 shows an electron micrograph of the flake pigment obtained in Comparative Example 1 in which 1 mass % alumina aerogel was dry-blended, and FIG. 4 shows an electron micrograph of the flake pigment obtained in Comparative Example 2 in which 1 mass % alumina aerogel was dry-blended. As compared with FIG. 1, in spite of the same amount of addition of alumina aerogel, an amount of adhesion of alumina aerogel (fine particles providing triboelectrification characteristics) to the flake pigments in FIGS. 3 and 4 is considerably small. This may be because fine particles providing triboelectrification characteristics were not much adhered to the surface of the flake pigment simply by mixing and because the fine particles formed an aggregated mass. In contrast, according to the present invention in which fine particles providing triboelectrification characteristics are fixed to the surface of the flake pigment through chemical bonding force, a large amount of fine particles providing triboelectrification characteristics are present at the surface of the flake pigment.

<Powder Coating>

<Preparation of Powder Paint>

A powder paint (a metallic powder paint) was prepared by blending each flake pigment obtained as above with polyester-based thermosetting resin powders (trade name "Teodur PE 785-900" manufactured by Kuboko Paint Co., Ltd.; an average particle size of 34 μm) that are thermosetting resin powders. A blending ratio is desirably set to a value satisfying such a condition that a plate to be painted is completely covered with flake pigments and its surface is smooth. When such a blending ratio as 15 g or more flake pigments with respect to 100 g thermosetting resin powders is required, coating is experimentally possible but it is not realistic in actual industrial production, and determination that coating is impossible will be made.

Since the thermosetting resin powders above have insufficient triboelectrification characteristics, in use, 0.2 g alumina aerogel had to be added to 100 g thermosetting resin powders. In doing so, a prescribed amount of alumina aerogel, from which an aggregated substance had been removed in advance through a 100 μm-mesh screen, was added to the thermosetting resin powders, followed by dry-blending. Then, the blended powders were again passed through the screen, to thereby obtain alumina-aerogel-containing thermosetting resin powders. In dry-blending, the alumina-aerogel-containing thermosetting resin powders were used for dry-blending.

<Coating and Baking>

Powder coating was performed in a triboelectrical manner. Triboelectrification-type coating was performed by hand-blowing using a hand-gun-type tribo gun (trade name "T-2m" manufactured by Asahi Sunac Corporation; nozzle: shower) at a paint feed speed of 47 g/min, at carried air flow rate of 70 L/min, and at an accelerated air pressure of 0.3 MPa, in a triboelectrification electrostatic coating apparatus (trade name "MTR-100" manufactured by Asahi Sunac Corporation). It is noted that a test piece had a size of 300 mm length×210 mm width. Baking was performed at 190° C. for 20 minutes in each case, to thereby fabricate a painted plate.

The results are summarized in Table 1 below (Experiments No. 1 to No. 5). In Table 1, the type of the flake pigment used for each Experiment No. was shown in the field of "Flake Pigment Used" with an Example No. or Comparative Example No. In addition, in the field of "Composition of Powder Paint" in Table 1, a ratio of each of the flake pigment and the alumina aerogel (fine particles contained in thermosetting resin powders, not fine particles securely adhered to the surface of the flake pigment with the outermost layer being interposed) occupied in the powder paint is shown in parts by mass with respect to 100 parts by mass thermosetting resin powders (in the field of "Alumina", parts by mass of the alumina aerogel are shown).

Comparing Experiments Nos. 1 to 3 with one another, while the concentration of the flake pigments in the powder paint is the same, evaluation of brightness and color unevenness could not be made for experiments other than Experiment No. 1 in which the flake pigment according to Example 1 of the present invention was used, because the paint turned out to become transparent (in the field of "State of Film" in Table 1, sufficient covering performance was evaluated as "3", fair covering performance was evaluated as "2", and a transparent state was evaluated as "1").

In Experiments No. 4 and No. 5, the concentration of the flake pigments in the powder paint was raised until a painted plate that can be evaluated was obtained. Though an experimentally satisfactory painted plate could be obtained, the concentration of the flake pigment in the powder paint was unrealistically high and no triboelectrification characteristics were substantially exhibited. Therefore, determination that triboelectrification electrostatic coating is impossible was made.

TABLE 1

| Experiment No. | Flake Pigment Used | Composition of Powder Paint | | State of Film | Concentration of Flake Pigment in Film (mass %) | Brightness (β/α) | Color Unevenness |
| --- | --- | --- | --- | --- | --- | --- | --- |
| | | Flake Pigment | Alumina | | | | |
| 1 | Example 1 | 5 | 0.2 | 3 | 2.3 | 247 | 4.8 |
| 2 | Comparative Example 1 | 5 | 0.2 | 1 | 0.9 | Transparent, and evaluation not available | |
| 3 | Comparative Example 2 | 5 | 0.2 | 1 | 1.9 | Transparent, and evaluation not available | |
| 4 | Comparative Example 1 | 15 | 0.2 | 2 | 2.1 | 235 | 4.2 |
| 5 | Comparative Example 2 | 25 | 0.5 | 3 | 7.7 | 123 | 4.4 |

In Table 1, a greater numeric value of "Brightness" indicates higher brightness (excellent metallicity) and a greater numeric value of color unevenness indicates less color unevenness, because color unevenness was derived from the results of sensory tests in which scores are given in five steps as described previously.

It was only Experiments No. 1 and No. 4 that could obtain painted plates free from color unevenness and having further higher brightness, and out of these, it is only Experiment No. 1 that concentration of the flake pigments in the powder paint is in a realistic range (has triboelectrification characteristics). This fact well demonstrates the effects of the present invention.

Though the embodiments and the examples of the present invention have been described above, combination of embodiments and examples described above as appropriate is also originally intended.

It should be understood that the embodiments and the examples disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A flake pigment, comprising:
    a flake particle;
    a single-layer or multiple-layer coat covering a surface of the flake particle; and
    a fine particle having an average particle size in a range from 5 nm to 1 μm,
    an outermost layer of said coat including a copolymer including one or more type of first bond unit originating from a fluoric polymerizable monomer having fluorine and one or more type of second bond unit originating from a polymerizable monomer having phosphate group, and
    said fine particle being fixed to the surface of said flake pigment with said outermost layer being interposed between said flake particle and said fine particle and having a characteristic to provide, to said flake pigment, stable triboelectrification characteristics, with color unevenness being suppressed.

2. The flake pigment according to claim 1, wherein
    said copolymer is a copolymer including said first bond unit, said second bond unit, and additionally one or more type of third bond unit originating from a polymerizable monomer.

3. The flake pigment according to claim 2, wherein
    said third bond unit originates from styrene or methyl methacrylate.

4. The flake pigment according to claim 1, wherein
    said fluoric polymerizable monomer having fluorine is perfluorooctylethyl acrylate, and
    said polymerizable monomer having a phosphate group is 2-methacryloyloxyethyl acid phosphate or 2-acryloyloxyethyl acid phosphate.

5. The flake pigment according to claim 1, wherein
    the content of said first bond unit is in a range of 1 to 40 mol %, the content of said second bond unit is in a range of 1 to 30 mol %, and a number average molecular weight is in a range of 1000 to 500000 in said copolymer.

6. The flake pigment according to claim 1, wherein
    said copolymer is a copolymer soluble in a solvent.

7. The flake pigment according to claim 1, wherein
    said fine particle is an alumina fine particle and/or a titanium oxide fine particle.

8. The flake pigment according to claim 1, wherein
    said fine particle is fixed in a range from 0.1 to 10 mass % with respect to said flake particle.

9. The flake pigment according to claim 1, wherein
    said flake particle is composed of aluminum or an aluminum alloy.

10. A powder paint, comprising:
    the flake pigment according to claim 1; and
    a thermosetting resin powder.

11. A powder-coated film obtained through a baking step after coating with the powder paint according to claim 10 using a triboelectrification electrostatic coating apparatus.

12. A painted product, having the powder-coated film according to claim 11 formed thereon.

13. A method of manufacturing the flake pigment according to claim 1, comprising the steps of:
    adding said flake particle and said copolymer to a good solvent in which said copolymer is soluble;
    adsorbing said copolymer to the surface of said flake particle by kneading and mixing said flake particle and said copolymer in said good solvent;
    adsorbing said fine particle to a surface of said copolymer by adding said fine particle to said good solvent; and
    achieving stable fixation of said copolymer by adding said good solvent, together with a substance dispersed therein, to a poor solvent in which said copolymer is insoluble.

* * * * *